United States Patent [19]

Stern et al.

[11] Patent Number: 5,712,361

[45] Date of Patent: Jan. 27, 1998

[54] CONJUGATED POLYMERS CONTAINING ANSA SUBSTRUCTURES AND THEIR USE AS ELECTROLUMINESCENCE MATERIALS

[75] Inventors: Roland Stern, Wiesbaden; Donald Lupo, Frankfurt am Main; Josef Salbeck, Kelkheim; Hermann Schenk, Hofheim; Thomas Stehlin, Kriftel; Klaus Müllen, Mainz; Ullrich Scherf, Mainz-Kastel; Joachim Huber, Ingelheim, all of Germany

[73] Assignee: Hoechst Aktiengesellschaft, Frankfurt, Germany

[21] Appl. No.: 496,202

[22] Filed: Jun. 28, 1995

[30] Foreign Application Priority Data

Jun. 30, 1994 [DE] Germany .................. 44 22 670.5

[51] Int. Cl.[6] .................. C08G 61/02; C08G 61/12
[52] U.S. Cl. .................. 528/86; 526/204; 526/213; 526/217; 526/222; 428/690; 428/917; 204/180.1; 204/299 R
[58] Field of Search .................. 428/690, 917; 204/180.1, 299 R; 528/86; 526/204, 213, 217, 222

[56] References Cited

U.S. PATENT DOCUMENTS

| | | |
|---|---|---|
| 3,172,862 | 3/1965 | Gurnee et al. |
| 4,975,165 | 12/1990 | Brandley .................. 204/182.1 |
| 5,019,231 | 5/1991 | Brandley et al. .................. 204/182.1 |
| 5,189,136 | 2/1993 | Wudl et al. |

FOREIGN PATENT DOCUMENTS

| | | |
|---|---|---|
| 0 442 861 | 8/1991 | European Pat. Off. |
| 0 443 861 | 8/1991 | European Pat. Off. |
| WO 90/13148 | 11/1990 | WIPO |

OTHER PUBLICATIONS

Advanced Materials, vol. 6, No. 6, Jun. 1994, p. 518, "Ladder Polymers".

Nature, vol. 368, Apr. 28, 1994, pp. 831–834 by A. Schlüter et al., entitled "Synthesis of a fully unsaturated all–carbon ladder polymer".

Makromolekulare Chemie, Macromolecular Symposia vol. 77, 1994, pp. 359–368 by M. Löffler et al., entitled "Structurally Perfect Ladder Polymers: Shape and Conversion".

Makromolekulare Chemie, Macromolecular Symposia, vol. 54, Feb. 1, 1992, pp. 465–476 by U. Fahnenstich et al., entitled "Design of Novel Structurally Defined Ladder–Type Polymers".

Macromolecular Rapid Communications, vol. 15, No. 11, Nov. 1, 1994, pp. 897–902, by J. Huber et al., entitled "A Soluble Poly–Para–Phenyleno Composed of Cyclophane Units: Poly 1,5–(Oxydecanoxy)–1,4–Phenylene".

Makromolekulare Chemie, Macromolecular Chemistry and Physics, vol. 193, No. 5, May 1, 1992, pp. 1127–1133, by U. Scherf et al., entitled "Polyarylenes and Poly(Arylenevinylene)s, 9a), The oxidized states of A (1–4–Phenylene) Ladder Polymer".

Löffler et al., "Structurally Perfect Ladder Polymers: Shape and Conversion", *Macromol. Symp.* 77:359–368 (1994).

Schlüter et al., "Synthesis of a Fully Unsaturated All–Carbon Ladder Polymer", *Letters to Nature* 368:831–834 (1994).

*Primary Examiner*—James J. Seidleck
*Assistant Examiner*—Duc Truong
*Attorney, Agent, or Firm*—Curtis, Morris & Safford, P.C.

[57] ABSTRACT

Conjugated polymers containing ansa substructures and their use as electroluminescence materials.

Conjugated polymers containing ansa substructures, which contain aromatic groups and in which adjacent aromatic groups are connected to one another in such a way that one ring atom of one aromatic group is directly linked to one ring atom of the other aromatic group and any further linkages of these two aromatic groups are possible only via a bridge containing at least one tetravalent carbon atom and/or heteroatom.

The polymers of the invention having ansa substructures are outstandingly suitable as electroluminescence materials, since they have a very high color purity.

5 Claims, No Drawings

CONJUGATED POLYMERS CONTAINING ANSA SUBSTRUCTURES AND THEIR USE AS ELECTROLUMINESCENCE MATERIALS There is a great industrial need for large-area solid-state light sources for a series of applications, predominantly in the field of display elements, VDU technology and lighting engineering. The demands placed on these light sources can at present not be completely satisfactorily met by any of the existing technologies.

As alternatives to conventional display and lighting elements, such as incandescent lamps, gas-discharge lamps and non-self-illuminating liquid crystal display elements, use has been made for some time of electroluminescence (EL) materials and devices such as light-emitting diodes (LED).

Besides inorganic electroluminescence materials and devices, low molecular weight organic electroluminescence materials and devices have also been known for about 30 years (see, for example, U.S. Pat. No. 3,172,862). However, until recently such compounds were greatly restricted in their practical usability.

WO 90/13148 and EP-A 0 443 861 describe electroluminescence devices containing a film of a conjugated polymer as light-emitting layer (semiconductor layer). Such devices give numerous advantages such as the opportunity of producing large-area, flexible displays in a simple and inexpensive manner. In contrast to liquid crystal displays, electroluminescence displays are self-illuminating and therefore require no additional back-illumination source.

A typical device according to WO 90/13148 comprises a light-emitting layer in the form of a thin, dense polymer film (semiconductor layer) which contains at least one conjugated polymer. A first contact layer is in contact with a first surface, a second contact layer is in contact with a further surface of the semiconductor layer. The polymer film of the semiconductor layer has a sufficiently low concentration of extrinsic charge carriers for, on application of an electric field between the two contact layers, charge carriers to be introduced into the semiconductor layer, with one contact layer becoming positively charged compared with the other layer and the semiconductor layer emitting radiation. The polymers used in such devices are conjugated. A conjugated polymer is a polymer possessing a delocalized electron system along the main chain. The delocalized electron system gives the polymer semiconducting properties and gives it the ability to transport positive and/or negative charge carriers with high mobility.

In WO 90/13148, poly(p-phenylene vinylene) is used as polymeric material for the light-emitting layer, and it is proposed that the phenyl group in such a material be replaced by a heterocyclic or a condensed carbocyclic ring system. To improve the processability of such polymers, derivatives containing alkyl or alkoxy side chains have already been prepared (see, for example, EP-A 0 442 861 and U.S. Pat. No. 5,189,136), these derivatives having an increased solubility.

Although these materials gave good results, the color purity, for example, is still unsatisfactory. Furthermore, it is hardly possible to generate a blue or white emission using the polymers known hitherto.

Since, in addition, the development of electroluminescence materials, in particular on the basis of polymers, can in no way be regarded as concluded, the manufacturers of lighting and display devices are interested in a wide variety of electroluminescence materials for such devices.

This is because, inter alia, only the combined action of the electroluminescence materials with the other components of the devices allows conclusions to be drawn as to the suitability of the electroluminescence material.

It is therefore an object of the present invention to provide new electroluminescence materials which, when used in lighting or display devices, are suitable for improving the property profile of these devices.

While low molecular weight ansa compounds are known and described in the literature, polymers containing ansa units have hitherto been described only by M. Löffler, A. Schlüter and V. Enkelmann, Nature 368 (1994) 831 and M. Löffler and A. Schlüter, Macromol. Symp. 77 (1994) 359.

This article describes conjugated polymers containing ansa substructures which are formed by linking benzene and naphthalene groups. The linking of the aromatic groups is such that one aromatic group is connected pairwise to two further aromatic groups and this connection comprises in each case two ring atoms of one aromatic group being directly linked to in each case two ring atoms of another aromatic group.

It has now surprisingly been found that certain conjugated polymers containing aromatic groups and ansa substructures have, besides an improved solubility in organic solvents and improved film-forming properties, in particular also good electroluminescence and photoluminescence with a high color purity.

The invention accordingly provides conjugated polymers containing ansa substructures, which contain aromatic groups and in which adjacent aromatic groups are connected to one another in such a way that one ring atom of one aromatic group is directly linked to one ring atom of the other aromatic group and any further linkages of these two aromatic groups are possible only via a bridge containing at least one tetravalent carbon atom and/or heteroatom.

The polymers of the invention having ansa substructures are outstandingly suitable as electroluminescence materials, since they have a very high color purity.

The compounds are well suited to achieving blue, yellow and white electroluminescence.

Further advantages of the polymers of the invention having ansa substructures are the low tendency to crystallize and the good film-forming properties of the compounds. Selection of appropriate starting compounds enables polymers having uniform stereochemistry and desired tacticity to be obtained and used.

For the purposes of the present invention, an ansa substructure is an aromatic or heteroaromatic group which is bridged by an aliphatic chain, which can also contain heteroatoms, multiple bonds and/or aliphatic and/or aromatic rings, with the bridge atoms not being permitted to be directly adjacent.

For the purposes of the present invention, polymers include homopolymers, copolymers, terpolymers and higher polymers.

For the purposes of the present invention, conjugated means fully or partially conjugated, with conjugation meaning a chain of three or more $sp^2$-hybridized carbon atoms.

The conjugation length in the fully or partially conjugated polymers of the invention is preferably at least sufficiently great for emission to occur in the visible region of the spectrum.

Preference is given to polymers of the invention containing one or more ansa substructures of the formulae (Ia) to (Ig),

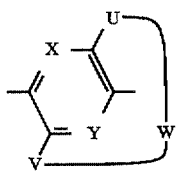 (Ia)

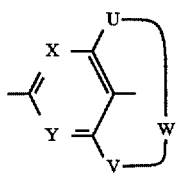 (Ib)

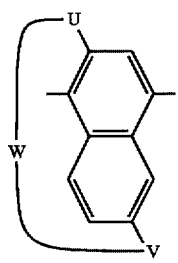 (Ic)

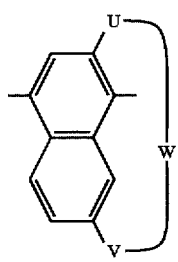 (Id)

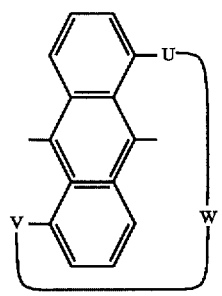 (Ie)

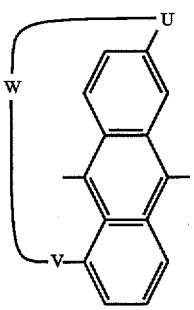 (If)

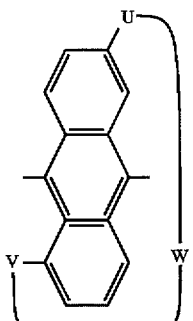 (Ig)

where the symbols and indices have the following meanings:

X, Y are $=CR^1-, =N-$;

U, V are $-O-$, $-S-$, $-NR^1-$, $-CR^1R^2-$;

$R^1$, $R^2$ are H, alkyl, alkoxy each having from 1 to 22 carbon atoms, CN, halogen, aryl, aryloxy, each having from 6 to 10 carbon atoms;

W is $-(CH_2)_q-$, $-(CH_2)_m$;

Z is $-CO-$, $-C\equiv C-C\equiv C-$, $-NHCO-$, $-S-(CH_2)_p-S-$, $-NH-$, $-CO(CH_2)_pCO-$, $-OCO(CH_2)_pCOO-$, $-NHCO(CH_2)_pCONH-$, $-NH(CH_2)_pNH-$, $-O(CH_2)_pO-$, $-O-$, 1,4-phenylene, $-S-$, $-SO_2-(CH_2)_p-SO_2-$, $-SO_2-$, $-CO-CHOH-$;

n, m, p are 0, 1, 2, ..., 20;

q is 5 ... 20

Particular preference is given to polymers of the formulae (II) and/or (III), $-[C_{m1}-D_{m2}]_{m3}-$ (II)

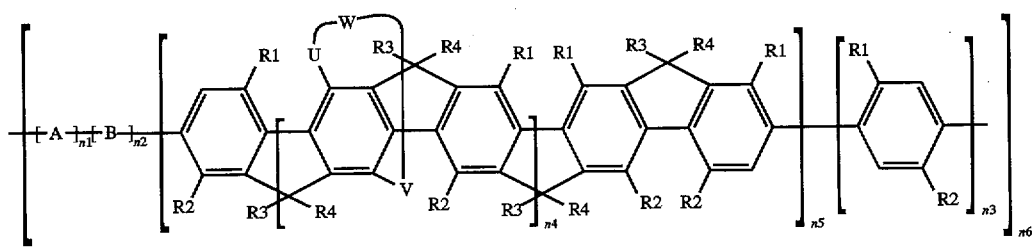
(III)

where the symbols and indices have the following meanings:

A,B,C are identical or different building blocks of the formulae (Ia) to (Ig)

D is

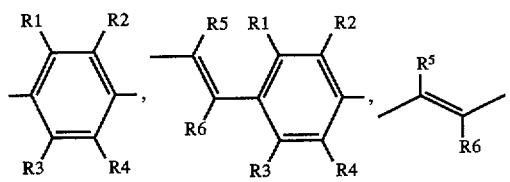

m1,m2 are 0, 1 to 20;

m3 is 1 to 2000;

U,V are —O—, —S—, —NR$^1$—, —CR$^1$R$^2$;

W is —(CH$_2$)$_q$—, —(CH$_2$)$_n$—Z—(CH$_2$)$_m$—;

Z is —CO—, —C≡C—C≡C—, —NHCO—, —S—(CH$_2$)$_p$—S—, —NH—, —CO(CH$_2$)$_p$CO—, —OCO(CH$_2$)$_p$COO—, —NHCO(CH$_2$)$_p$CONH—, —NH(CH$_2$)$_p$NH—, —O(CH$_2$)$_p$O—, —O—, 1,4-phenylene, —S—, —SO$_2$—(CH$_2$)$_p$—SO$_2$—, —SO$_2$—, —COCHOH—;

n,m,p are 0, 1, 2, ..., 20;

q is 5 ... 20

R1, R2, R3, R4, R5, R6 are H, alkyl, alkoxy, each having from 1 to 22 carbon atoms, aryl, aryloxy, each having from 6 to 10 carbon atoms, CN, halogen;

n1,n2, n3 are 0, 1 ... 20;

n4, n5 are 0, 1 ... 2000 and n6 is 1 ... 2000

Examples of particularly preferred ansa substructures are:

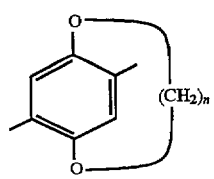

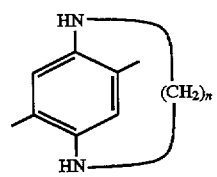

-continued

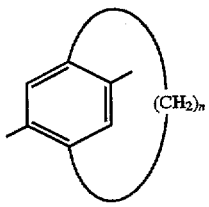

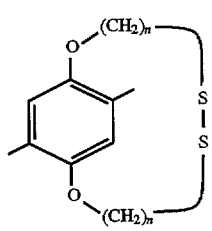

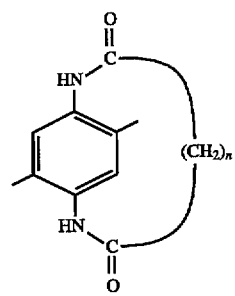

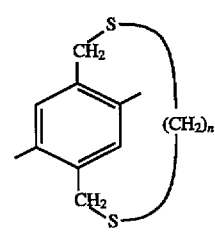

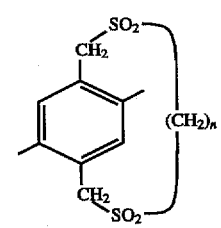

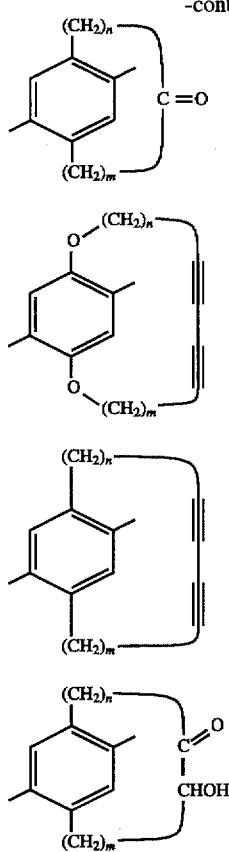

where n, m are each from 0 to 20 and n+m is from 4 to 20.

The polymers of the invention have, inter alia, a considerably increased solubility in organic solvents with at the same time only a slight increase in the molecular diameter. As a result, i.e. owing to their increased aspect ratio × (length/diameter), such molecules frequently show liquid-crystalline behavior.

Owing to the ansa substructures, there is the possibility of preparing polymers of uniform stereochemistry, for example by the use of optically active monomers; furthermore, the position of the emission maximum frequently be controlled in a targeted manner by appropriate selection of the tacticity of the polymer, i.e. be shifted bathochromically or hypsochromically.

The compounds of the invention or used according to the invention are prepared by methods known per se in the literature, as are described in standard works on organic synthesis, e.g. Houben-Weyl, Methoden der Organischen Chemie, Georg-Thieme-Verlag, Stuttgart and in the appropriate volumes of the series "The Chemistry of Heterocyclic Compounds" by A. Weissberger and E. C. Taylor (editors).

The preparation is here carried out under reaction conditions which are known and suitable for the specified reactions. In this preparation, use can also be made of variants known per se and not mentioned in more detail here.

Preference is given to the preparation of compounds of the invention by three routes.

1. The first route comprises the chemical coupling of suitably substituted ansa compounds to give polymers of the structure of the invention. It is here possible to conjugatively bond the ansa compounds either directly or by means of suitable spacer segments. Suitable spacer segments are, in particular, arylenes such as 1,4-phenylene, 2,5-disubstituted 1,4-phenylene, 1,4- and 1,5-naphthylene, 1,4- and 9,10-anthrylene building blocks (and also the corresponding heteroaromatic analogs), furthermore also monosubstituted or disubstituted vinylene units, with the preferred substituents of the arylene and vinylene segments being alkyl, aryl, alkoxy and aryloxy groups or else CN, halogen. The chemical coupling between the ansa compounds, directly or by means of the specified spacer groups, then proceeds via functional groups (with —H also being able to act as a functional group) with which the preformed ansa substructures and spacer segments are furnished. Methods for aryl-aryl and aryl-olefin linkage are used here. Methods known in the literature for this purpose are, in particular:

transition metal-catalyzed couplings of the HECK type [see, for example, R. F. Heck, Org. Reactions 27 (1981) 345], the YAMAMOTO type [see, for example, T. Yamamoto, Prog. Polym. Sci. 1153], the SUZUKI type [see, for example, Miyaura, N., Yanagi, T., Suzuki, A., Synth. Commun. 11 (1981) 513] and the STILLE type [see, for example, J. K. Stille, Angew. Chem. 98 (1986) 504; Int. Ed. Engl. 25 (1986) 508], and also other well-known coupling methods [see, for example, HOUBEN-WEYL, Methoden der Organischen Chemie, Volume 5/2b "Arene, Arine", Thieme, Stuttgart, 1981].

oxidative aryl-aryl couplings such as the SCHOLL reaction [see, for example, R. Scholl, C. Seer; Ann. 394 (1912) 111], or the oxidative coupling of electron-rich heteroaromatics such as thiophene or pyrrole.

carbonyl olefination reactions of the WITTIG, HORNER-EMMONS or McMURRY types [see, for example, HOUBEN-WEYL, Methoden der Organischen Chemie, Volume 5/1b "Alkene, Cycloalkene, Arylalkene", Thieme, Stuttgart 1972], or the reductive linking of suitable carbonyl derivatives ($\alpha,\alpha'$-dihalogen compounds, thioketones, diazoketones) [see, for example, HOUBEN-WEYL, Methoden der Organischen Chemie, Volume 5/1b "Alkene, Cycloalkene, Arylalkene", thieme, Stuttgart 1972].

2. The second route comprises the synthesis of suitable prepolymers which, in a subsequent thermally or photolytically induced elimination reaction, are converted into conjugated polymers of the formula (II). Such routes are well-known in the literature and are used, for example, for the synthesis of poly(arylene vinylene) s, such as poly (phenylene vinylene) [cf., for example, U.S. Pat. No. 3,706, 677; U.S. Pat. No. 3,532,643; F. Louwet, D. Vanderzande, J. Gelan, Synth. Met., Short Commun. 52 (1992) 125]. The circuitous route via a soluble prepolymer here makes possible the preparation of conjugated polymers which otherwise, owing to their intrinsically poor solubility, are unobtainable or obtainable only with comparatively low molecular weights. In addition, it is also possible, in particular, to process at the prepolymer stage conjugated polymers which do not melt without decomposition and are insoluble. For the polymers of the invention containing ansa groups, which owing to their special structure and the lower intermolecular interaction associated therewith have an increased solubility, this route is an alternative for the first-described route. If the polymers of the invention are only sparingly soluble, despite the ansa groups, the second route is preferred to the first.

3. The third route enables polymers of the formula (III) to be prepared. Here, there is first synthesized a suitable prepolymer which is subsequently converted into the desired structure of the invention via a polymer-analogous reaction. Here, use is made of, in particular, reactions which lead to bridging of monomer segments present to form highly condensed, planar substructures. This preferably occurs by intramolecular condensation or cyclization reactions of the FRIEDEL-CRAFTS type (alkylation, acylation [cf., for example, DE-A 41 11 878]), electron-transfer-induced cyclization reactions (reductive and oxidative condensation [cf., for example, U. Scherf, K. Müllen; Synthesis (1992) 23]), carbonyl olefination reactions (as, for example, described above) or by means of photochemical cyclizations (condensations).

In this way, pure conductor polymers [cf., for example, K. Chmil, U. Scherf, Makromol. Chem., Rapid Commun. 14 (1993) 217] and copolymers built up of twisting spacer segments (A and B in formula (III)) and conductor segments (see WO-A 95/07955) can be obtained. In the case of the copolymers, the ansa structures can be built into either the spacer segments or into the conductor segments. This is achieved by mixing suitable monomers which at least potentially represent the future structural constituents. The coupling of the monomer building blocks is here carried out, for example, by means of the above-described methods of aryl-aryl or aryl-olefin coupling.

The copolymers have a random distribution of the monomer building blocks.

According to the invention, the compounds described are used as electroluminescence materials, i.e. they serve as active layer in an electroluminescence device. For the purposes of the present invention, an active layer is an electroluminescence material which, on application of an electric field, is capable of radiating light (light-emitting layer) or a material which improves the injection and/or the transport of the positive and/or negative charges (charge-injection layers and charge-transport layers).

The invention accordingly also provides for the use of the polymers of the invention as electroluminescence materials.

The invention further provides an electroluminescence device having one or more active layers comprising one or more polymers of the invention having an ansa substructure. The active layer can, for example, be a light-emitting layer and/or a transport layer and/or a charge-injection layer.

The general structure of such electroluminescence devices is described, for example, in U.S. Pat. No. 4,539,507 and U.S. Pat. No. 5,151,629. Polymer-containing electroluminescence devices are described, for example, in WO 90/13148 or EP-A 0 443 861.

They customarily comprise an electroluminescing layer between a cathode and an anode, with at least one of the electrodes being transparent. In addition, an electron-injection and/or electron-transport layer can be introduced between the electroluminescing layer and the cathode and/or a hole-injection and/or a hole-transport layer can be introduced between the electroluminescing layer and the anode. Suitable cathodes are, for example, Ca, Mg, Al, In, Mg/Ag. As anode, use can be made, for example, of Au or ITO (indium oxide/tin oxide on a transparent substrate, for example of glass or a transparent polymer).

In operation, the cathode is placed at a negative potential with respect to the anode, thus injecting electrons from the cathode into the electron-injection layer/electron-transport layer or directly into the light-emitting layer. At the same time, holes from the anode are injected into the hole-injection layer/hole-transport layer or directly into the light-emitting layer.

The charge carriers injected move towards one another through the active layers under the action of the applied potential. This leads, at the interface between charge-transport layer and light-emitting layer or within the light-emitting layer, to electron-hole pairs which recombine with emission of light. The color of the emitted light can be varied by means of the compound used as light-emitting layer.

Electroluminescence devices are used, for example, as self-illuminating display elements such as control lamps, alphanumeric displays, signs, and in optoelectronic couplers.

The invention is illustrated by the examples, without being restricted to them.

EXAMPLES

EXAMPLE 1

Poly [15,17- (2,13-dioxabicyclo[12.2.2]-14,16,17-octadecatriene)]

15,17-Dibromo-2,13-dioxabicyclo[12.2.2]-14,16,17-octadecatriene (or 14,17-dibromo-1,12-dioxa[12] paracyclophane)

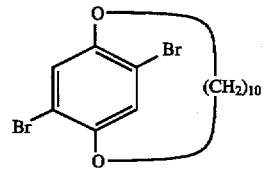

by the method of R. C. Fuson, H. O. House, J. Am. Chem. Soc. 75 (1953) 1327 or A. Lüttringhaus, H. Gralheer, Liebigs Ann. Chem. 550 (1942) 67.

2,5-Dibromohydroquinone was obtained by the method of Benedikt (Mon. 1 (1881) 345) by bromination of hydroquinone in hot glacial acetic acid. Melting point 185°–186° C. after recrystallization from $SO_2$-containing water.

2,5-Dibromohydroquinone mono(ω-bromodecyl) ether 87 ml of 2.65 molar methanolic potassium hydroxide solution are added dropwise over a period of one hour to a boiling, stirred solution of 164 g of 2,5-dibromohydroquinone and 345 g of decamethylene bromide in 250 ml of ethanol. After boiling for a further 2 hours until the mixture becomes neutral, the mixture is poured into 1 l of hot water, shaken well and the aqueous layer is decantered off while still lukewarm. To remove excess 2,5-dibromohydroquinone, this operation is repeated a further two times. Excess decamethylene bromide is removed by distillation at 0.4 torr. The monoeter formed (2,5-dibromohydroquinone mono(ω-bromodecyl1) ether) is obtained after vacuum sublimation (120°–140° C. at 0.001 torr).

The product can be further purified by recrystallization from petroleum ether and subsequently from aqueous methanol (yield 51%, melting point 67° C.).

2,5-Dibromohydroquinone mono(ω-bromododecyl) ether Preparation in the above-described manner from 280 g of 1,12-dibromododecane and 90 g of 2,5-dibromohydroquinone in 200 ml of alcohol and 35 ml of 3.06 molar methanolic potassium hydroxide solution.

The excess dibromide is distilled off at 0.05 torr and a bath temperature not exceeding 155° C., the monoether is distilled over at 0.001 torr below 160° C. in a short-path apparatus (yield 22 g). The monoether can be purified by recrystallization from petroleum ether and from aqueous methanol (melting point 71° C.).

Cyclization of the monoether 15,17-Dibromo-2,13-dioxabicyclo[12.2.2]-14,16,17-octadecatriene. A solution of 30 g of 2,5-dibromohydroquinone mono(ω-bromodecyl) ether in 500 ml of isoamyl alcohol is added dropwise over a period of 42 hours while stirring vigorously to 1 l of isoamyl alcohol containing 35 g of finely powdered dehydrated potassium carbonate. After heating for a further 1 hour, filtering off in organic material and distilling off the solvent in vacuo, the residue is extracted with 100 ml of diethyl ether. The ether phase is subsequently washed with 2N sodium hydroxide solution and water. Drying and evaporation of the ether phase gives 17 g (68%) of 15,17-dibromo-2,13-dioxabicyclo[12.2.2]-14,16,17-octadecatriene. (Boiling point 167°–168° C. at 0.1 torr). The substance can be recrystallized from ethanol (melting point 96° C.).

2,13-Dioxabicyclo[12.2.2]-14,16,17-octadecatriene-15,17-bisboronic acid.

26.87 ml (43 mmol) of n-butyllithium (1.6M in hexane) are added dropwise at −78° C. under argon to a solution of 7.00 g (17.2 mmol) of 15,17-dibromo-2,13-dioxabicyclo-[12.2.2]-14,16,17-octadecatriene in 250 ml of diethyl ether. The reaction mixture is warmed to room temperature and stirred for a further 2 hours. The solution is then transferred to a dropping funnel and added dropwise to a solution of 27.77 ml (120 mmol) of triisopropyl borate in 150 ml of diethyl ether cooled to −78° C. The reaction mixture is stirred for a further 12 hours at room temperature. After hydrolysis with 200 ml of 2N hydrochloric acid, the precipitate obtained is filtered off, washed with 1 l of cold water and dried at 50° C./0.01 mbar. Yield: 2.79 g (48%) of 2,13-dioxabicyclo[12.2.2]-14,16,17 -octadecatriene- 15,17-bisboronic acid. $^1$H NMR (200 MHz, $d^6$-DMSO): d 7.84 (4H), 7.36 (2H), 4.42 (2H), 4.21 (2H), 1.70 (2H), 1.52 (2H), 1.10 (4H), 0.97 (4H), 0.67 (4H). $^{13}$C NMR (50 MHz, $d^6$-DMSO): d 157.12, 126.76, 123.28, 69.2, 27.34, 27.14, 23.73.

Poly [15,17-(2,13-dioxabicyclo [12.2.2]-14,16,17-octadecatriene]

20 ml of an aqueous 1M potassium carbonate solution are added to a solution of 0.500 g (1.5 mmol) of 2,13-dioxabicyclo [12.2.2]-14,16,17-octadecatriene-15,17-bisboronic acid and 0.606 g (1.5 mmol) of 15,17-dibromo-2,13-dioxabicyclo[12.2.2]-14,16,17-octadecatriene in 20 ml of THF. The mixture is boiled under reflux and 26 mg of tetrakis-(triphenylphosphino)palladium(0) in 5 ml of THF are added. After boiling under reflux for 2 days, the mixture is poured into 200 ml of methanol. The precipitate formed is filtered off, washed with 50 ml of dilute hydrochloric acid and redissolved in methylene chloride. The solution obtained is dried, evaporated and the polymer is precipitated by addition of methanol. Yield: 533 mg (48%) of poly [15,17-(2,13-dioxabicyclo[12.2.2]-14,16,17-octadecatriene)]. $^1$H NMR (200 MHz, CDCl$_3$): d 7.27 (2H), 4.30 (2H), 4.02 (2H), 1.07 (16H). $^{13}$C NMR (125 MHz, CDCl$_3$): d 149.05, 127.96, 121.55, 70.49, 27.56, 27.50, 27.36, 24.37.

EXAMPLE 2

Conductor polymer

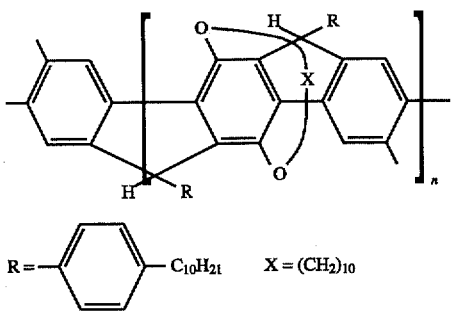

Polyketone

A solution of 1.078 g (1.49 mmol) of 2',5'-dibromo-4-decyl-4'-(4-decylbenzoyl)benzophenone and 0.5 g (1.49 mmol) of 2,13-dioxabicyclo[12.2.2]-14,16,17-octadecatriene-15,17-bisboronic acid in 10 ml of THF is added to 10 ml of an aqueous 1M potassium carbonate solution. The mixture is boiled under reflux and 25 mg of tetrakis-(triphenylphosphino)palladium(0) in 5 ml of THF are added. After boiling under reflux for 48 hours, the mixture is poured into 100 ml of methanol. The precipitated form is filtered off, washed with 100 ml of dilute hydrochloric acid and redissolved in methylene chloride. The methylene chloride solution obtained is dried, evaporated and the polymer is precipitated by addition of methanol. Yield: 745 mg (79%) of polyketone. $M_n$:22,300 $M_w$:36,400 (according to GPC)

Polyalcohol

A solution of 700 mg (0.865 mmol based on monomer units) of polyketone in 70 ml of toluene is added to a suspension of 245 mg (6.44 mmol) of lithium aluminum hydride in 70 ml of THF. The mixture is stirred at room temperature for 30 minutes and subsequently carefully admixed with ethanol, water and dilute hydrochloric acid. The organic phase is washed with water, dried and evaporated to dryness. The polymer is redissolved in THF and precipitated with water. Yield: 634 mg (91%) of polyalcohol.

Conductor polymer

A solution of 500 mg (0.613 mmol) of polyalcohol in 300 ml of dichloromethane is admixed with 1.8 g (12.66 mmol) of boron trifluoride etherate. After stirring at room temperature for 5 minutes, 100 ml of ethanol are added first and subsequently 200 ml of water are added. The organic phase is separated off, washed with water, dried and evaporated. Precipitation in acetone gives the conductor polymer as yellow powder. Yield: 420 mg (88%). $M_n$:36,200 $M_w$:56,700 (according to GPC)

The gel permeation chromatography (GPC) was carried out using PL-gel columns (three columns, 10 μm gel, pore width 50, $10^3$ and $10^4$ nm) with a coupled UV/VIS detector. All GPC analyses were carried out on 1,2-dichlorobenzene solutions of the polymers at 70° C. (concentration of the polymer 2 g/l). Calibration was carried out by means of polystyrene standards having a narrow molecular weight distribution.

EXAMPLE 3

17,19-Dibromo-2,15-dioxabicyclo[14.2.2]-16,18,19-eicosatriene (or 16,19-dibromo-1,14-dioxa[14]paracyclophane)

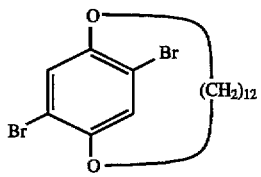

17,19-Dibromo-2,15-dioxabicyclo[14.2.2]-16,18,19-eicosatriene 20 g of 2,5-dibromohydroquinone mono(ω-bromododecyl) ether, prepared by a method similar to Example 1, dissolved in 250 ml of amyl alcohol are added dropwise over a period of 19 hours with vigorous stirring to 1 l of amyl alcohol containing 15 g of finely powdered dehydrated potassium carbonate. After heating for a further 1 hour, filtering off in organic material and distilling off the solvent in vacuo, the residue is extracted with 100 ml of diethyl ether. The ether phase is subsequently washed with 2N sodium hydroxide solution and water. Drying and evaporation of the ether phase gives 12 g (71%) of 17,19-dibromo-2,15-dioxabicyclo[14.2.2]-16,18,19-eicosatriene (boiling point: 170° C. at 0.06 torr). The substance can be recrystallized from ethanol (melting point: 77°–78° C.).

EXAMPLE 4

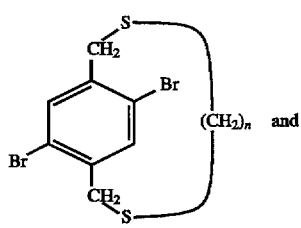

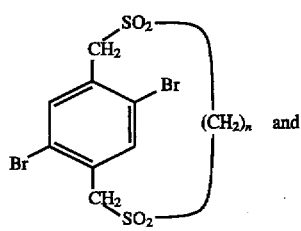

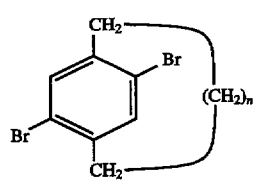

where n=4 to 10

Reaction scheme 1:

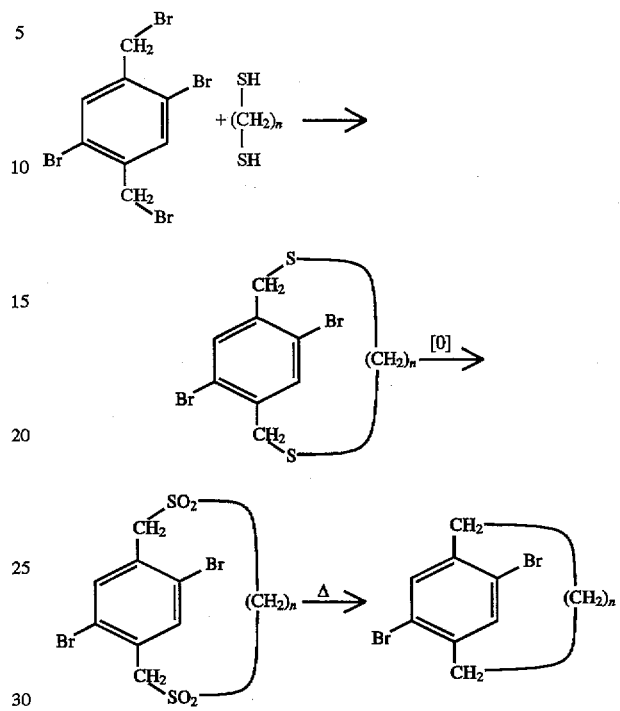

according to F. Vögtle, Chemiker Zeitung 94 (1970) 313; or T. Otsubo, S. Misami, Synth. Commun. 8 (1978) 285.

General method for preparing the dithiacyclophanes: 30 mmol of 2,5-dibromo-1,4-bis(bromomethyl)benzene in 250 ml of benzene and also 30 mmol of the relevant ω,ω'-dimercaptoalkane and 60 mmol of NaOH in 250 ml of 95% strength ethanol are added dropwise over a period of 5 hours simultaneously from two precision dropping funnels to 2.2 l of stirred, boiling ethanol. After boiling for 12 hours, the mixture is evaporated to dryness in vacuo. The residue is taken up in benzene and chromatographed over neutral aluminum oxide using benzene.

Oxidation to the disulfones: 10 mmol of the dithiacyclophane are mixed with 20 ml of glacialacetic acid and 6 ml of 35% strength aqueous hydrogen peroxide solution. The mixture is heated at 100° C. for 5 hours and then cooled in an ice bath. The colorless crystals obtained are filtered off, washed with water and dried.

Pyrolysis to give the paracyclophanes: For the pyrolysis, 200 mg of the above disulfone are placed in a pyrex tube (40×1.0 cm) which has been closed at one end by melting. The other end of the glass tube is closed with some glass wool and connected to a pump. The tube is evacuated to 30–50 torr and pushed into a 15 cm long tube furnace at 650° C. The oily product condenses at the cold end. The reaction is complete after a few minutes. Chromatography over silica gel using pentane gives the paracyclophane.

EXAMPLE 5

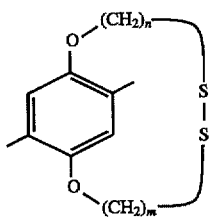

where n=1–10, m=1–10 and n+m=4–12.

Reaction scheme:

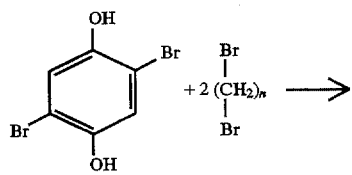

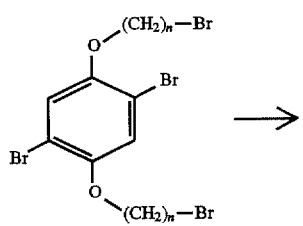

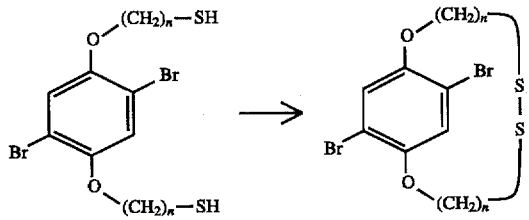

according to A. Lüttringhaus, F. Cramer, H. Prinzbach, Angew. Chem. 69 (1957) 137 or A. Lüttringhaus, F. Cramer, H. Prinzbach, F. M. Henglein, Ann. 613 (1958) 185.

General method 2,5-Dibromohydroquinone bis(ω-bromo-1-alkyl) ether: 50 mmol of 2,5-dibromohydroquinone and 500 mmol of the relevant ω,ω'-dibromoalkane are initially charged in 150 ml of ethanol. At 50° C., a solution of 110 mmol of KOH in 30 ml of 50% strength ethanol is allowed to drop in over a period of 30 minutes under nitrogen while stirring and the mixture is boiled under reflux until it is neutral. After allowing to stand overnight, the product is filtered off with suction. It can be purified by recrystallization from alcohol (yield: 80%).

Bisthiuronium salt: 10 mmol of the 2,5-dibromohydroquinone bis(ω-bromo-1-alkyl) ether and 24 mmol of thiourea are boiled under reflux in 30 ml of ethanol for 12 hours. The salt which separates on cooling is recrystallized from ethanol (yield: 94%).

2,5-Dibromohydroquinone bis(ω-mercapto-1-alkyl) ether: 30mmol of bisthiuroniumsalt recrystallized from ethanol are boiled with 300 mmol of KOH in 100 ml of water for one hour, with the salt being completely dissolved. With internal ice cooling, the solution is acidified with 5N hydrochloric acid and the precipitated product is filtered off with suction (nitrogen atmosphere). Recrystallization from ethanol gives fine platelets, readily soluble in chloroform and benzene (yield: 80%).

Cyclization to give the dithiacyclophanes. A moderate stream of air is passed for 12 hours into a solution of 12 mmol of the 2,5-dibromohydroquinone bis(ω-mercapto-1-alkyl) ether and 24 mmol of CuCl$_2$·2H$_2$O in 4 l of dioxane and 100 ml of water in a 5 l flask fitted with intensive cooler and immersion frit. After a short time, colorless flocs precipitate, and these are filtered off. After filtration and addition of Fe(II)SO$_4$, the mixture is evaporated to 100 ml at 30° C. under reduced pressure. The flocs precipitated by means of 100 ml of water are extracted with ethanol in a hot extractor and the extraction solution is evaporated to 50 ml. The product crystallizes on cooling (yields between 2% and 15%).

EXAMPLE 6

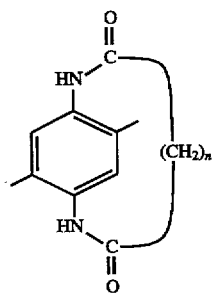

Reaction scheme:

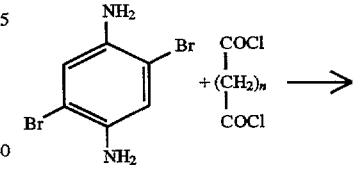

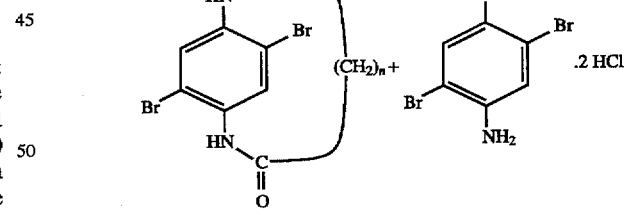

according to H. Stetter, L. Marx-Moll, Ber. 91 (1958) 677.

EXAMPLE 7

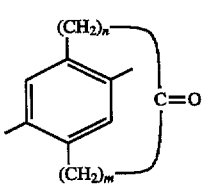

where n=0–10, m=0–10 and n+m=6–14; according to E. Forneau, P. M. Baranger, Bull. Soc. Chim. France 49 (1931)

1161 or R. Huisgen, Ann. Chem. 586 (1954) 52 (for compounds having n=0).

EXAMPLE 8

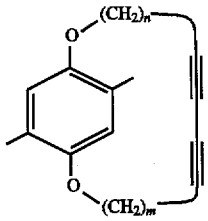

where n=1–10, m=1–10 and n+m=6–14. according to T. Inone, T. Kaneda, S. Mitsumi, Tetrahedron Lett. (1974) 2969.

EXAMPLE 9

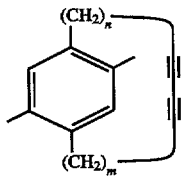

where n=1–10, m=1–10 and n+m=6–14; according to T. Inone, T. Kaneda, S. Mitsumi, Tetrahedron Lett. (1974) 2969.

EXAMPLE 10

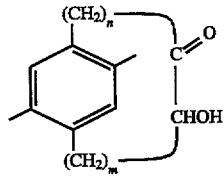

where n=1–20, m=1–10 and n+m=6–14; according to R. Kelly, D. M. McDonald, K. Wiesner, Nature 166 (1950) 225, or K. Wiesner, Can. J. Research 28B (1950) 561.

EXAMPLE 11

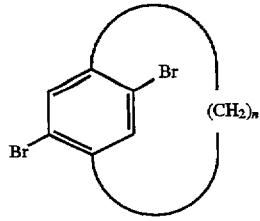

where n=8–16; according to D. J. Cram, H. U. Daeniker, J. Am. Chem. Soc. 76 (1954) 2743.

Further syntheses of suitable cyclophane units for the buildup of the polymer structures of the invention are described, for example, in B. H. Smith, "Bridged Aromatic Compounds", Academic Press, N.Y. 1964 and references cited therein.

EXAMPLE 12

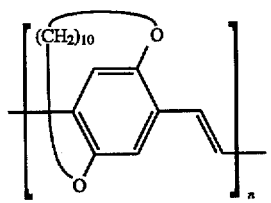

A 200 ml autoclave is charged with 14.6 mmol (5.932 g) of 15,17-dibromo-2,13-dioxabicyclo[12.2.2]-14,16,17-octadecatriene (prepared by a method similar to Example 3), 32.1 mmol (3.249 g) of triethylamine, 0.15 mmol (32.7 mg) of palladium(II) acetate, 0.87 mmol (0.266 g) of tri-o-tolylphosphine, 100 ml of DMF and a stirrer bar. The autoclave degassed and subsequently charged with 16 mmol (0.42 g) of ethene. The mixture is then heated at 100° C. for 48 hours. After cooling the mixture, the polymer is precipitated by addition of methanol, dried in vacuo and finally extracted with 200 ml of chloroform in a Soxhlet apparatus. The chloroform-soluble part is then reprecipitated by addition of methanol. Both parts (chloroform-soluble and insoluble part) are vacuum dried at 100° C. for 24 hours.

$M_n$ 2000 $M_w$:3000 (according to GPC)

$^1$H—NMR spectrum (200 MHz in CDCl$_3$): δ in ppm: 7.33 (2H), 7.21 (2H), 4.28 (4H), 1.19 (16H) $^{13}$C NMR spectrum (50 MHz in CDCl$_3$): δ in ppm: 151.76, 123.61, 70.9, 29.96, 28.58, 28.38, 28.02, 27.67, 26.68, 24.65

All data is based on the chloroform-soluble part of the atactic polymer.

We claim:

1. A conjugated polymer comprising ansa substructures, which comprises aromatic groups and in which adjacent aromatic groups are connected to one another in such a way that one ring atom of one aromatic group is directly linked to one ring atom of the other aromatic group and any further linkages of these two aromatic groups are possible only via a bridge containing at least one tetravalent carbon atom and/or heteroatom.

2. The conjugated polymer comprising ansa substructures as claimed in claim 1, which comprises one or more ansa substructures of the formulae (Ia) to (Ig),

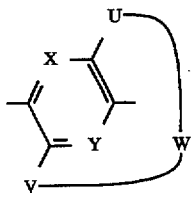 (Ia)

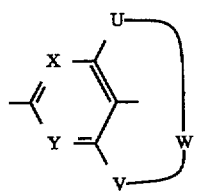 (Ib)

-continued (Ic)
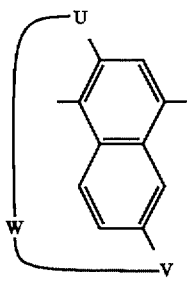

(Id)
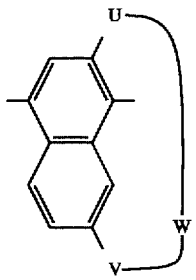

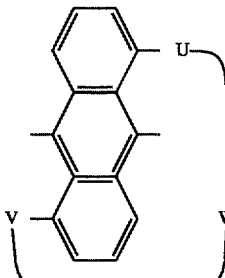

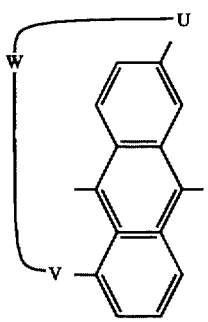

(Ig)
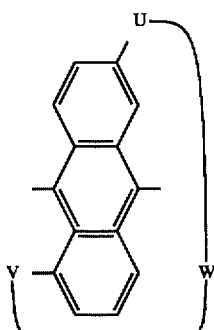

where the symbols and indices have the following meanings:

X,Y are =CR$^1$—, =N—;
U,V are —O—, —S—, —NR$^1$—, —CR$^1$R$^2$—;

R$^1$,R$^2$ are H, alkyl, alkoxy each having from 1 to 22 carbon atoms, CN, halogen, aryl, aryloxy, each having from 6 to 10 carbon atoms;

w is —(CH$_2$)$_q$—, —(CH$_2$)$_n$—Z—(CH$_2$)$_m$;

z is —CO—, —CpC—CpC—, —NHCO—, —S—(CH$_2$)$_p$—S—, —NH—, —CO(CH$_2$)$_p$CO—, —OCO(CH$_2$)$_p$COO—, —NHCO(CH$_2$)$_p$CONH—, —NH(CH$_2$)$_p$NH—, —O(CH$_2$)$_p$O—, —O—, 1,4-phenylene, —S—, —SO$_2$—(CH$_2$)$_p$—SO$_2$—, —SO$_2$—, —CO—CHOH—;

n,m,p are 0, 1, 2, . . . , 20;

q is 5 . . . 20.

3. The conjugated polymer comprising ansa substructures as claimed in claim 2, which comprises one or more ansa substructures selected from the group consisting of:

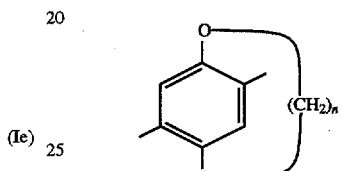

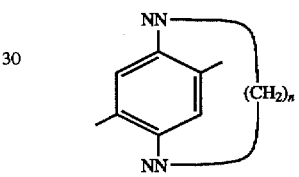

(If)
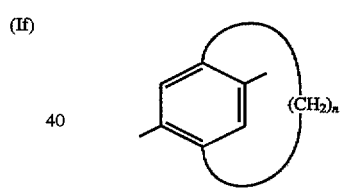

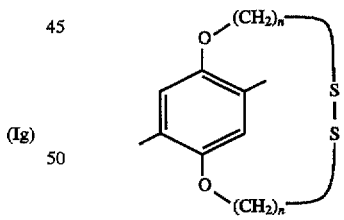

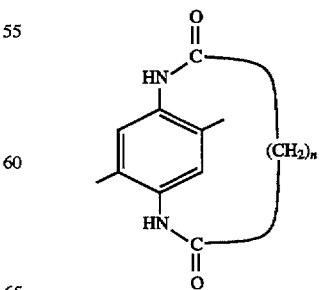

-continued

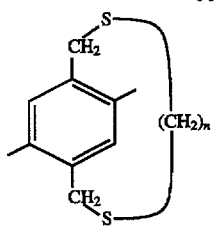

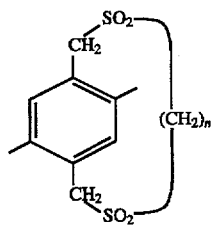

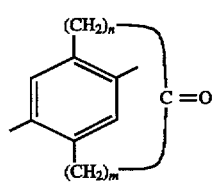

-continued

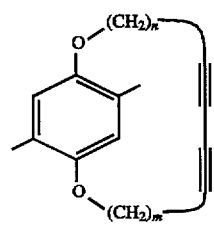

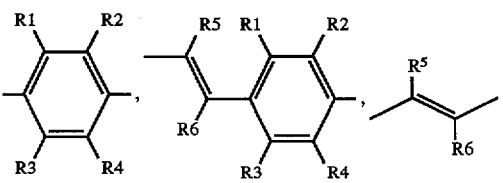

where n, m are each from 0 to 20 and n+m is from 4 to 20.

4. The conjugated polymer containing ansa substructures as claimed in claim 2, which has the formula (II) and/or (III),

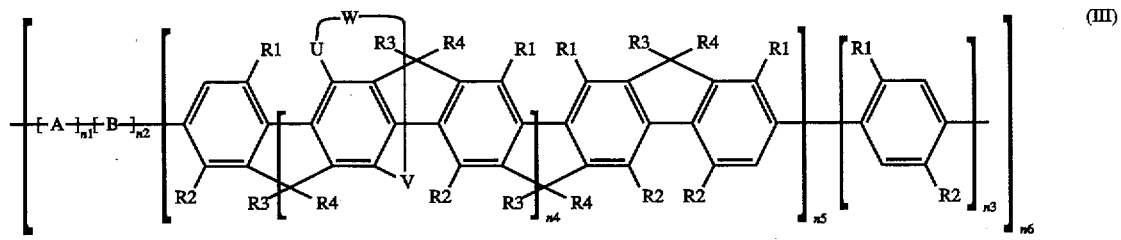

where the symbols and indices have the following meanings:
A,B,C are identical or different building blocks of the formulae (Ia) to (Ig)
D is m1,m2 are 0, 1 to 20;
m3 is 1 to 2000;
U,V are —O—, —S—, —NR$^1$, —CR$^1$R$^2$;
W is —(CH$_2$)$_q$—, —(CH$_2$)$_n$—Z—(CH$_2$)$_m$—;
Z is —CO—, —CpC—CpC—, —NHCO—, —S—(CH$_2$)$_p$—S—, —NH—, —CO(CH$_2$)$_p$CO—, —OCO(CH$_2$)$_p$COO—, —NHCO(CH$_2$)$_p$CONH—, —NH(CH$_2$)$_p$NH—, —O(CH$_2$)$_p$O—, —O—, 1,4-phenylene, —S—, —SO$_2$—(CH$_2$)$_p$—SO$_2$—, —SO$_2$—, —CO—CHOH—;
n,m,p are 0, 1, 2, . . . , 20;

q is 5 ... 20

R1, R2, R3, R4, R5, R6 are H, alkyl, alkoxy, each having from 1 to 22 carbon atoms, aryl, aryloxy, each having from 6 to 10 carbon atoms, CN, halogen;

n1, n2, n3 are 0, 1 ... 20;

n4, n5 are 0, 1 ... 2000 and n6 is 1 ... 2000.

5. An electroluminescence device comprising conjugated polymers comprising one or more ansa substructures as claimed in claim 1.

* * * * *